Figure 3:
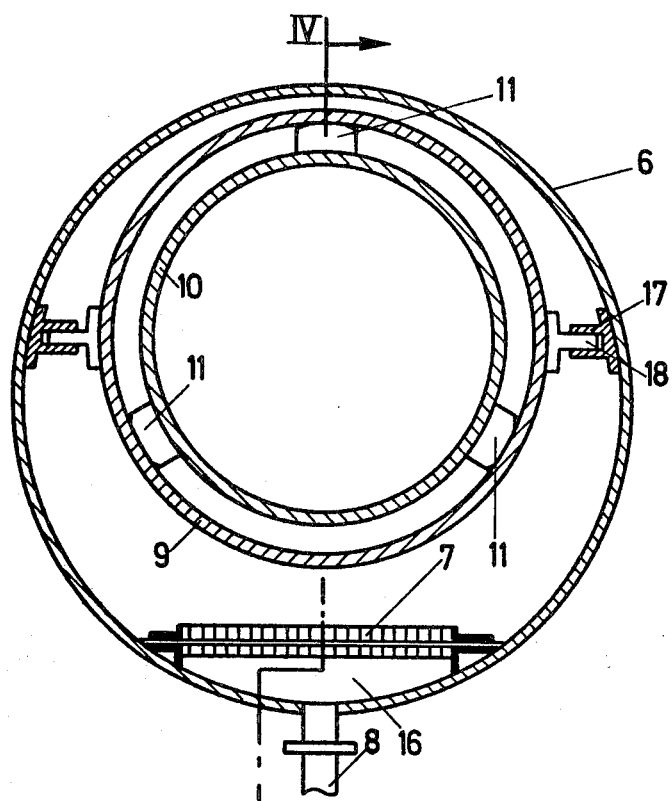

United States Patent [19]

Merz

[11] 4,160,567
[45] Jul. 10, 1979

[54] PNEUMATIC UNLOADING DEVICE

[75] Inventor: Walter Merz, Küsnacht, Switzerland

[73] Assignee: Swiss Aluminium Ltd., Chippis, Switzerland

[21] Appl. No.: 849,950

[22] Filed: Nov. 9, 1977

[30] Foreign Application Priority Data

Dec. 13, 1976 [CH] Switzerland .................. 15675/76

[51] Int. Cl.² ........................................... B65G 53/20
[52] U.S. Cl. ................................. 406/98; 406/115; 406/151
[58] Field of Search ............... 214/12, 13, 14; 302/17, 302/28, 29, 31, 33, 34, 45, 47, 58, 64

[56] References Cited
U.S. PATENT DOCUMENTS 4,019,641  4/1977  Merz ............................. 302/12

FOREIGN PATENT DOCUMENTS 960991   1/1975  Canada ........................................ 302/58
1258334  1/1968  Fed. Rep. of Germany ............. 302/34
2157602  8/1972  Fed. Rep. of Germany ............. 302/58

*Primary Examiner*—Jeffrey V. Nase
*Attorney, Agent, or Firm*—Bachman and LaPointe

[57] ABSTRACT

A pneumatic device for unloading cargoes of particulate materials from ships' holds is described in which inside a length of pipe, which sucks the material out of the hold and is principally in the horizontal position, there is at least one fluidizing base which transports the material further and into a silo. The fluidizing or transporting base can be selected to match the requirements for efficient transportation of different kinds of particulate material.

12 Claims, 27 Drawing Figures

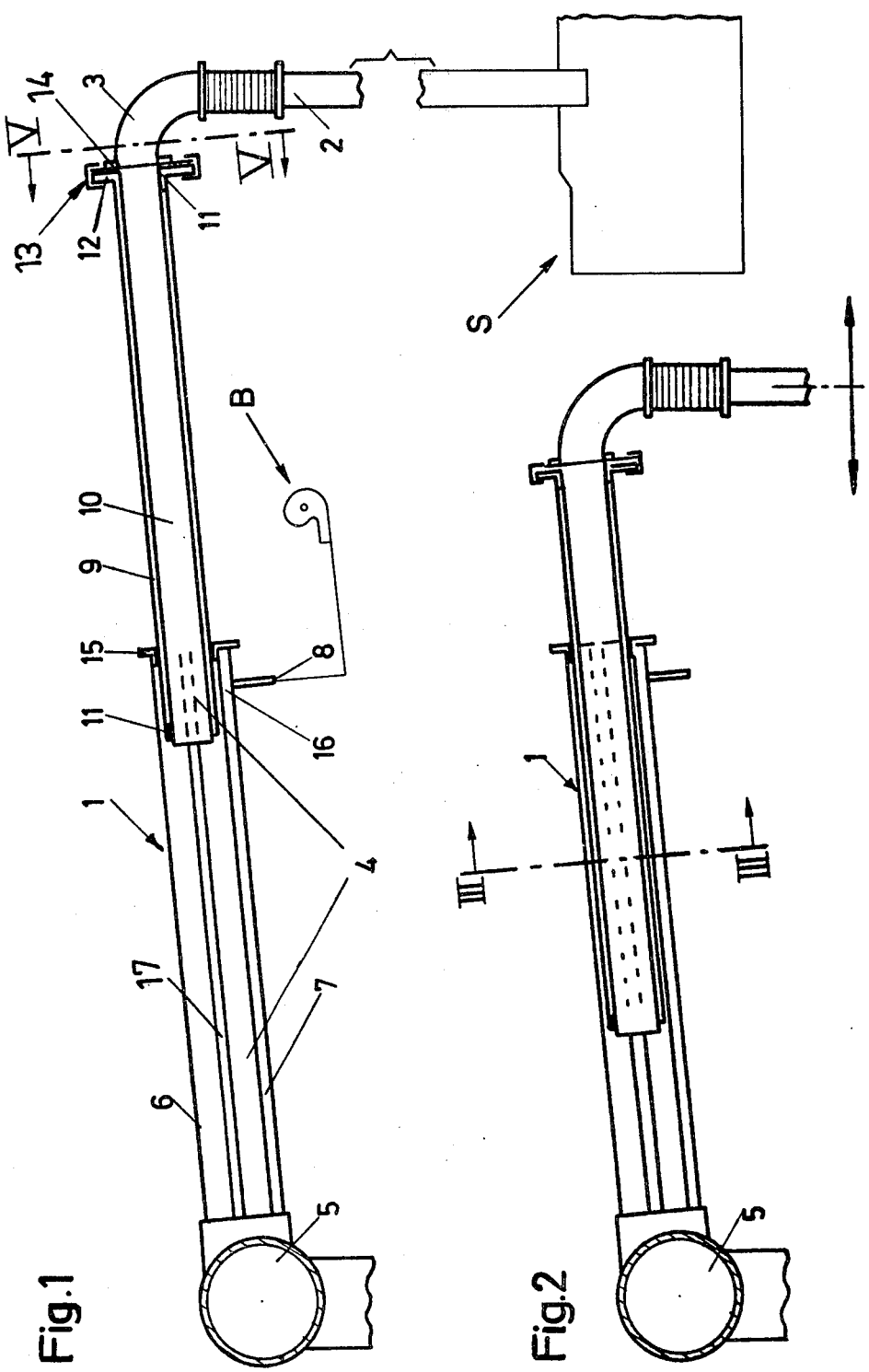

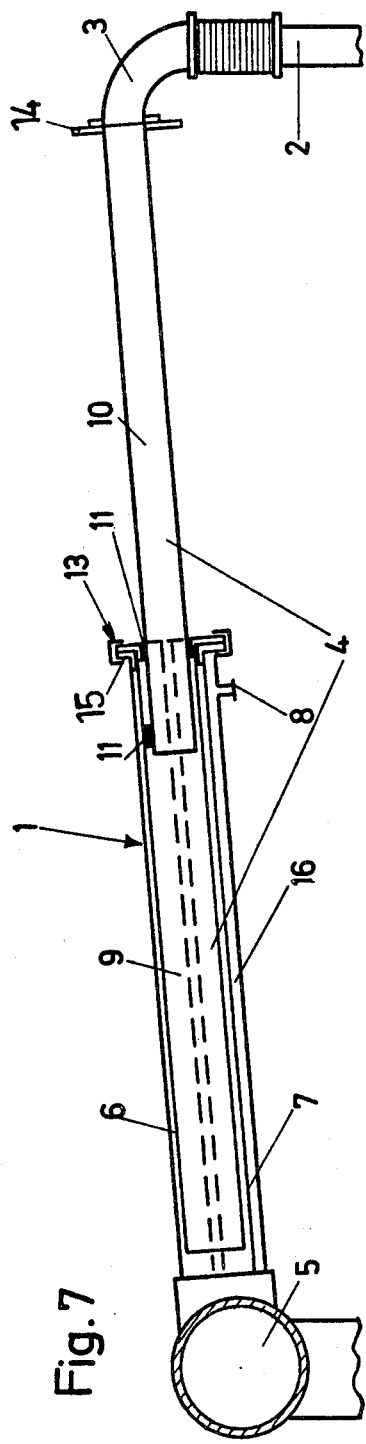
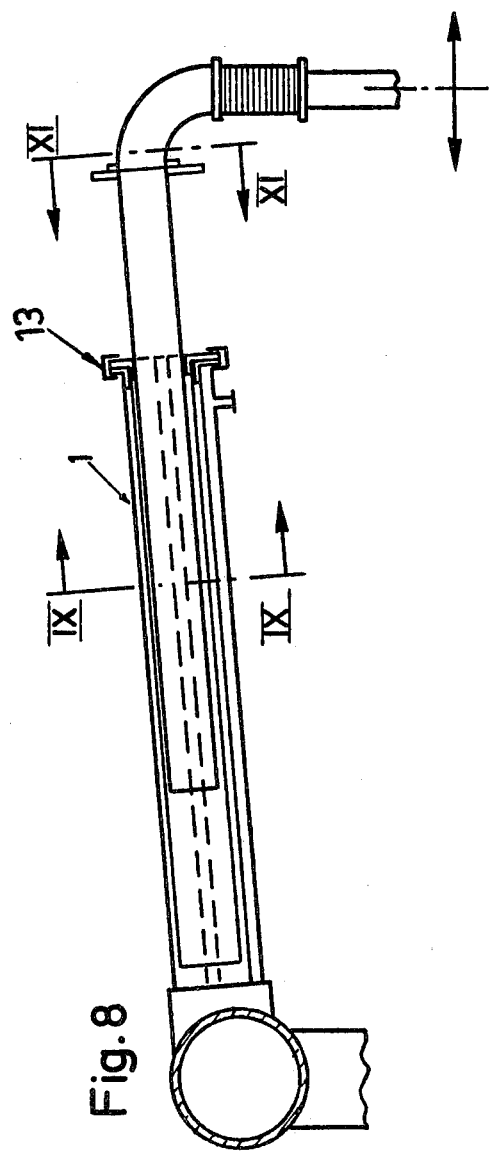
Fig. 7
Fig. 8

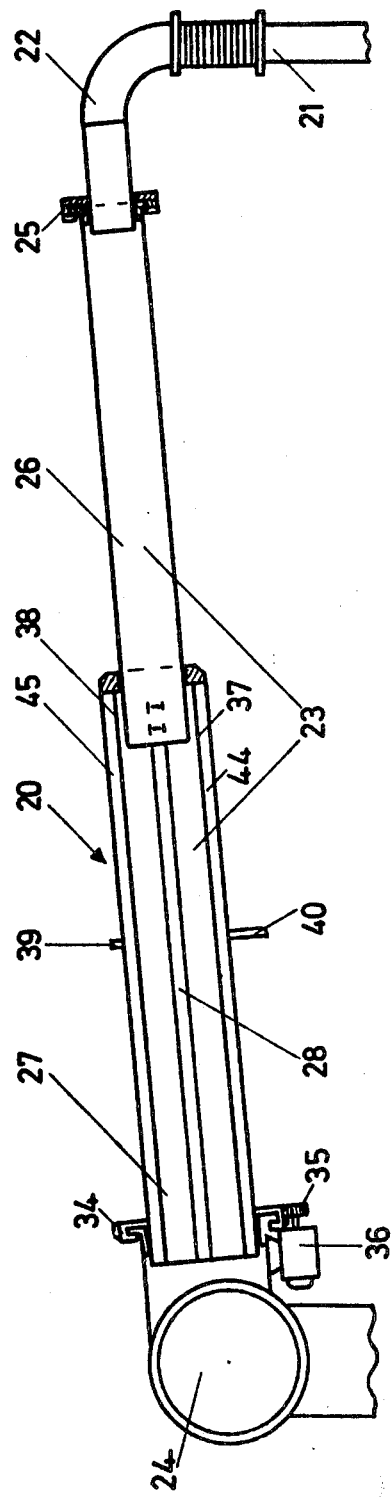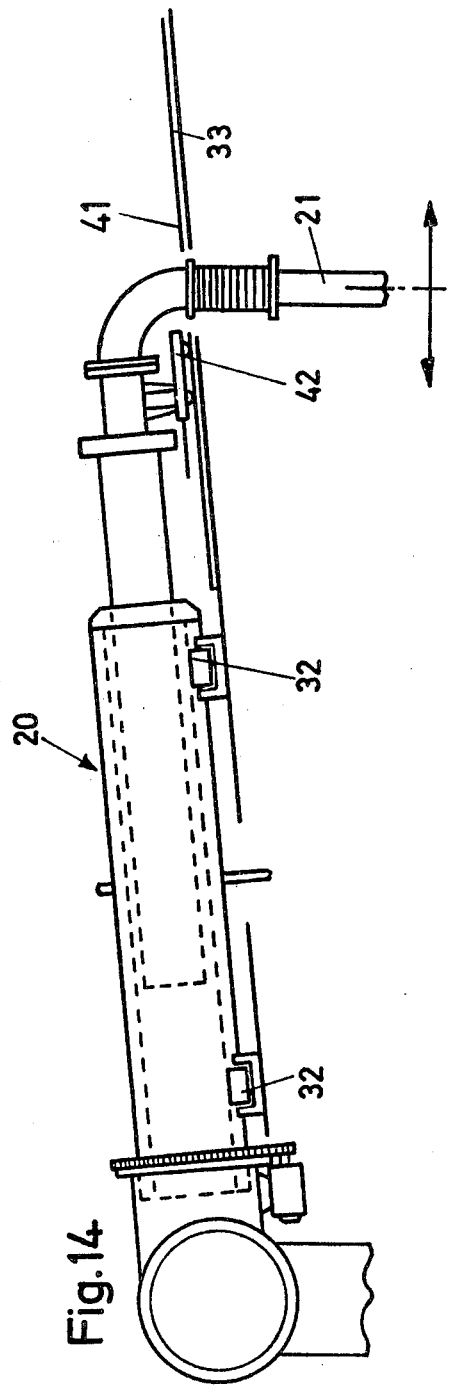
Fig.13
Fig.14

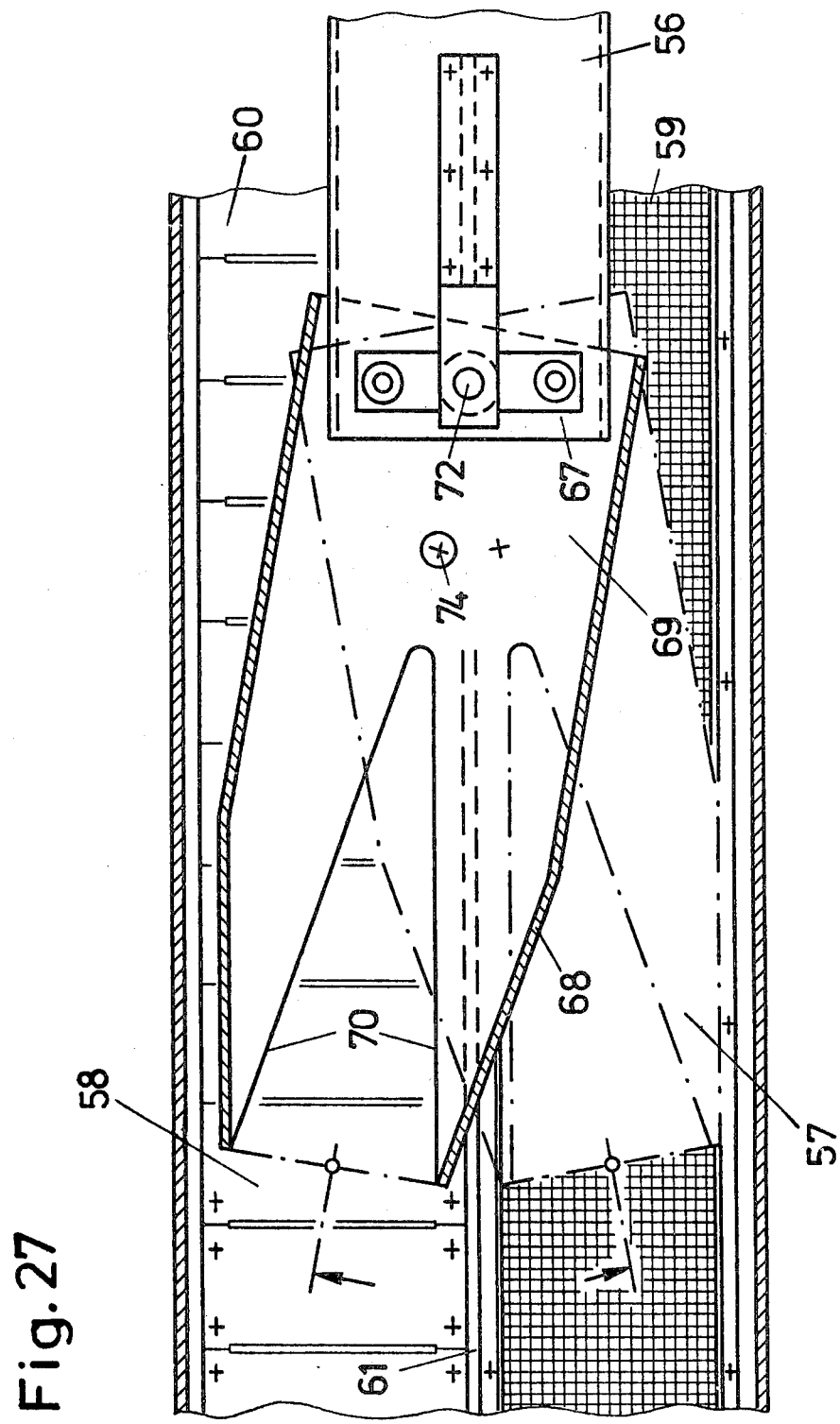

PNEUMATIC UNLOADING DEVICE

The invention presented here concerns a pneumatic unloading device which is used to unload cargoes of particulate materials from ships into a silo, and comprises at least one pipe which sucks the material such as alumina, grain or the like particulate materials out of the ship's hold, an additional pneumatic conveyor system and a suction pump.

There are facilities, which are already known, which suck the cargo out of the ship's hold using a pneumatic means of transport, raise it to an elevated level and pass it round a bend of 90° or more into the horizontal or inclined position and transport it further into a gas-particulate material separator situated in a crane structure. In such elevating and conveying systems the pneumatic transport from the ship's hold to the separator, which is on land and is normally built into the structure of the crane, is one complete system. These systems (see the Swiss Pat. No. 531,970) are particularly well suited to the elevating and conveying of abrasive materials in directions away from the vertical, where they are conveyed over more or less horizontal stretches since it is known, particularly in the case of heavy powders and materials, that very high air transport speeds of e.g. 25 m/sec and more are required when in the horizontal stretch over which the material is transported no special conveyor facilities are provided to convey it along the bottom of the pipe.

The present invention represents essentially a further development of the elevating and conveyance device described in the Swiss Pat. No. 531,970, with which already relatively high air transportations speeds can be achieved, so that in many cases such conveyance devices are made advantageous both from the point of view of wear and the energy consumed.

In the case of the known elevating and conveying systems there was a restriction in the choice of materials which could be conveyed, since the fluidizer base in the horizontal part of the conduit system is designed for a specific load of material so that it is conveyed with optimum efficiency, that is to say for example that light corn grains can be transported only with relatively low efficiency, if, in the horizontal stretch of pipe, the fluidizing base which has been installed is mainly suited for the conveyance of a specific material such as e.g. alumina. The object of the present invention is therefore to extend the range of application of pneumatically operating unloading devices.

This object is accomplished by way of the invention in that in a principally horizontal section of pipe there is provided at least one conveyor base which is suited to the conveyance of various materials of choice, can be brought into operation under the suction stream and can be covered partly or wholly with a covering device.

The drawings show three exemplified embodiments of the invention in a simplified schematic form viz., FIG. 1 a first embodiment of a pneumatic unloading device showing a transport base which is covered by means of pipe which can be slid telescopically inside a section of pipe in the device which is in the operating position for unloading a fine grained material.

FIG. 2 the embodiment of a pneumatic unloading device shown in FIG. 1 in which an inner and intermediate pipe are pushed simultaneously into a central position inside an outer pipe.

FIG. 3 a transverse section through the unloading device along the line III—III in FIG. 2.

Figure 4:
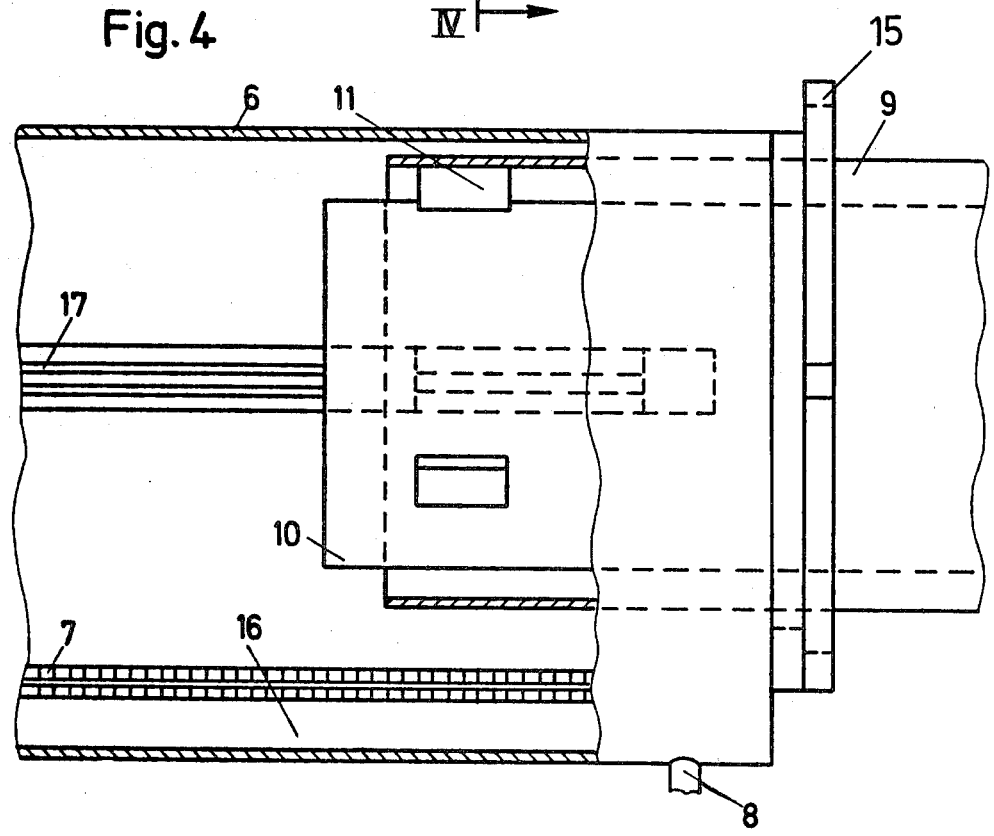

FIG. 4 a longitudinal section through the unloading device along the line IV—IV in FIG. 3.

Figure 5:
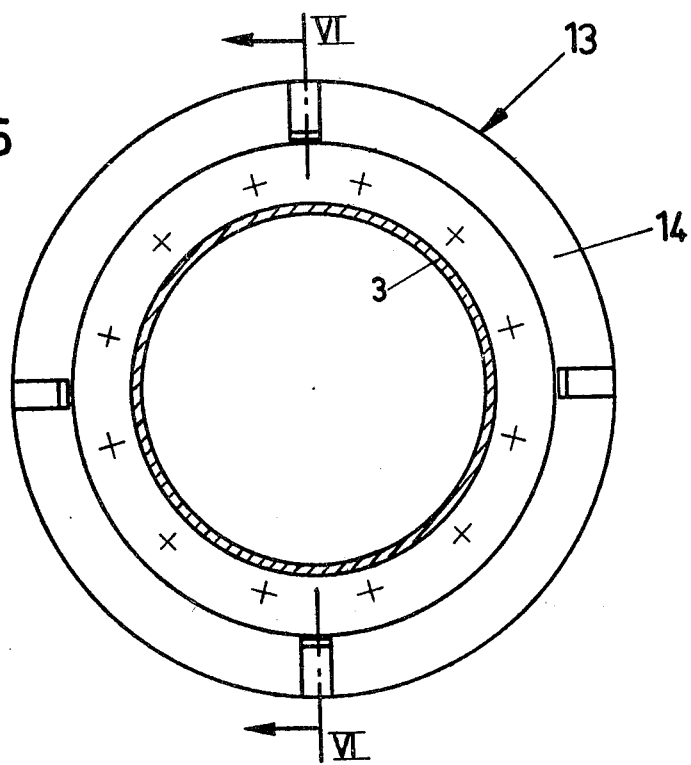

FIG. 5 a transverse cross section through a rapid coupling facility of the unloading device shown in FIGS. 1 and 2, along line V—V in FIG. 1.

Figure 6:
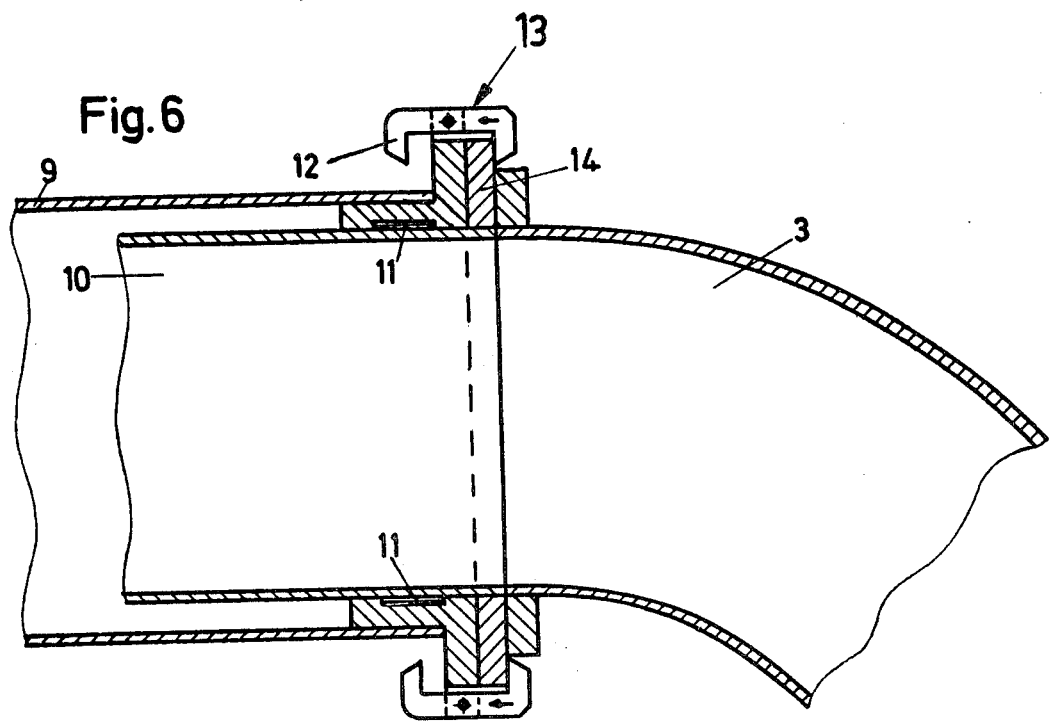

FIG. 6 a longitudinal section through a rapid coupling facility of the unloading device shown in FIGS. 1 and 2, along line VI—VI in FIG. 5.

FIG. 7 the unloading device shown in FIG. 1 however with an intermediate pipe which is pulled completely inside the outer pipe, putting the transportation base out of service.

FIG. 8 the unloading device shown in FIG. 7 with an inner pipe drawn back inside an intermediate pipe into a central position.

Figure 9:
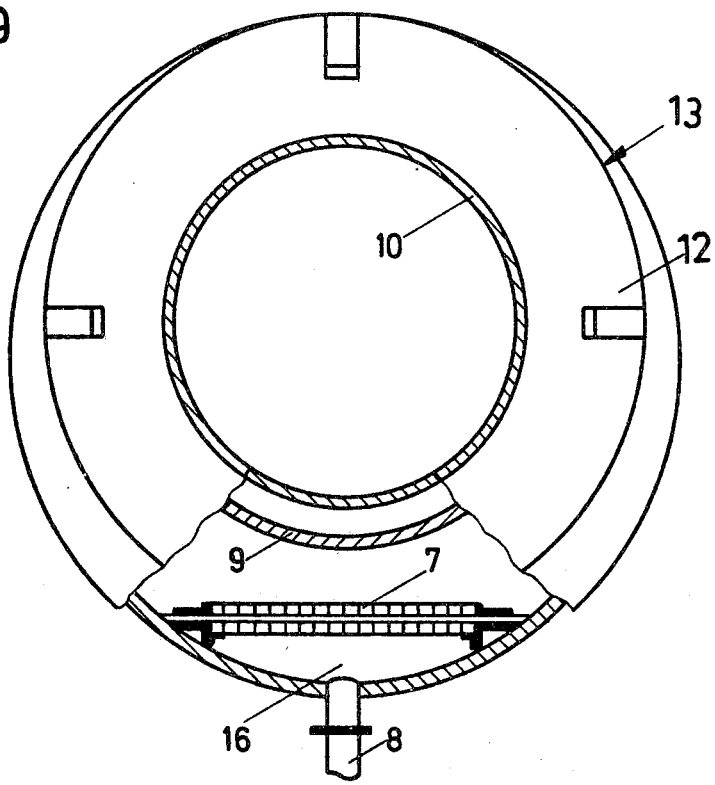

FIG. 9 a cross section along the line IX—IX through the unloading device shown in FIG. 8.

Figure 10:
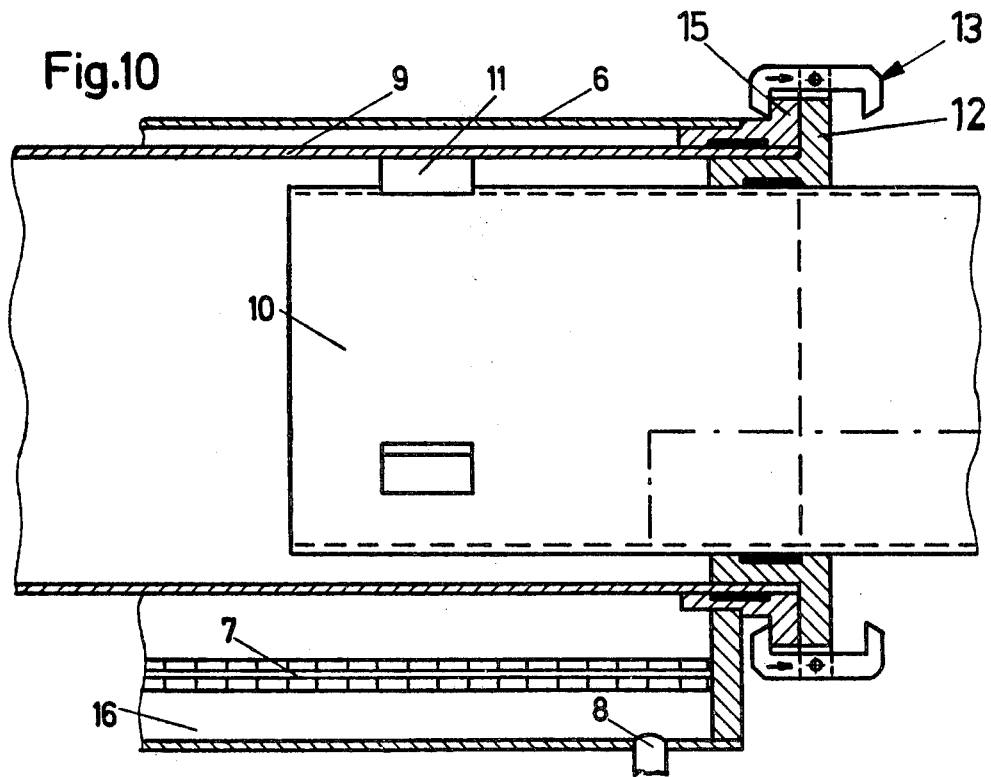

FIG. 10 a longitudinal section along the line X—X through the unloading device shown in FIG. 7.

Figure 11:
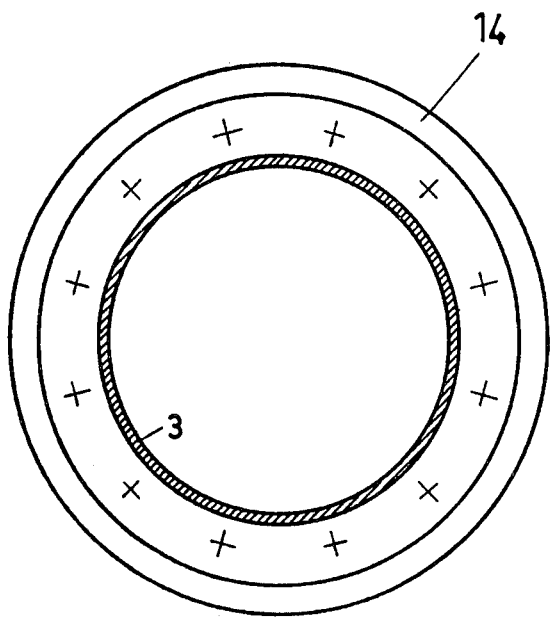

FIG. 11 a cross section along the line XI—XI through the unloading device shown in FIG. 8.

Figure 12:
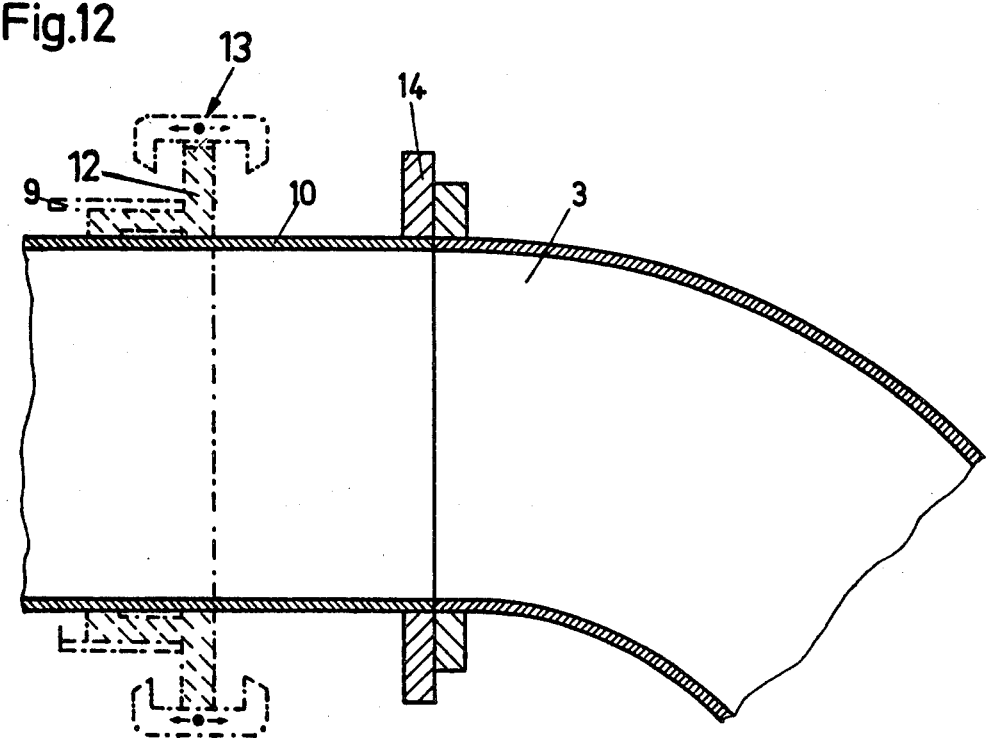

FIG. 12 a longitudinal section along the line XII—XII through the unloading device shown in FIG. 9.

FIG. 13 a second exemplified embodiment of a pneumatic unloading device showing a pipe which can be drawn telescopically inside an outer pipe of the device and a device for tilting the outer pipe which rests on roller bearings.

FIG. 14 the second embodiment of a pneumatic unloading device shown in FIG. 13, however with an inner pipe drawn into the outer pipe and in an intermediate position.

Figure 15:
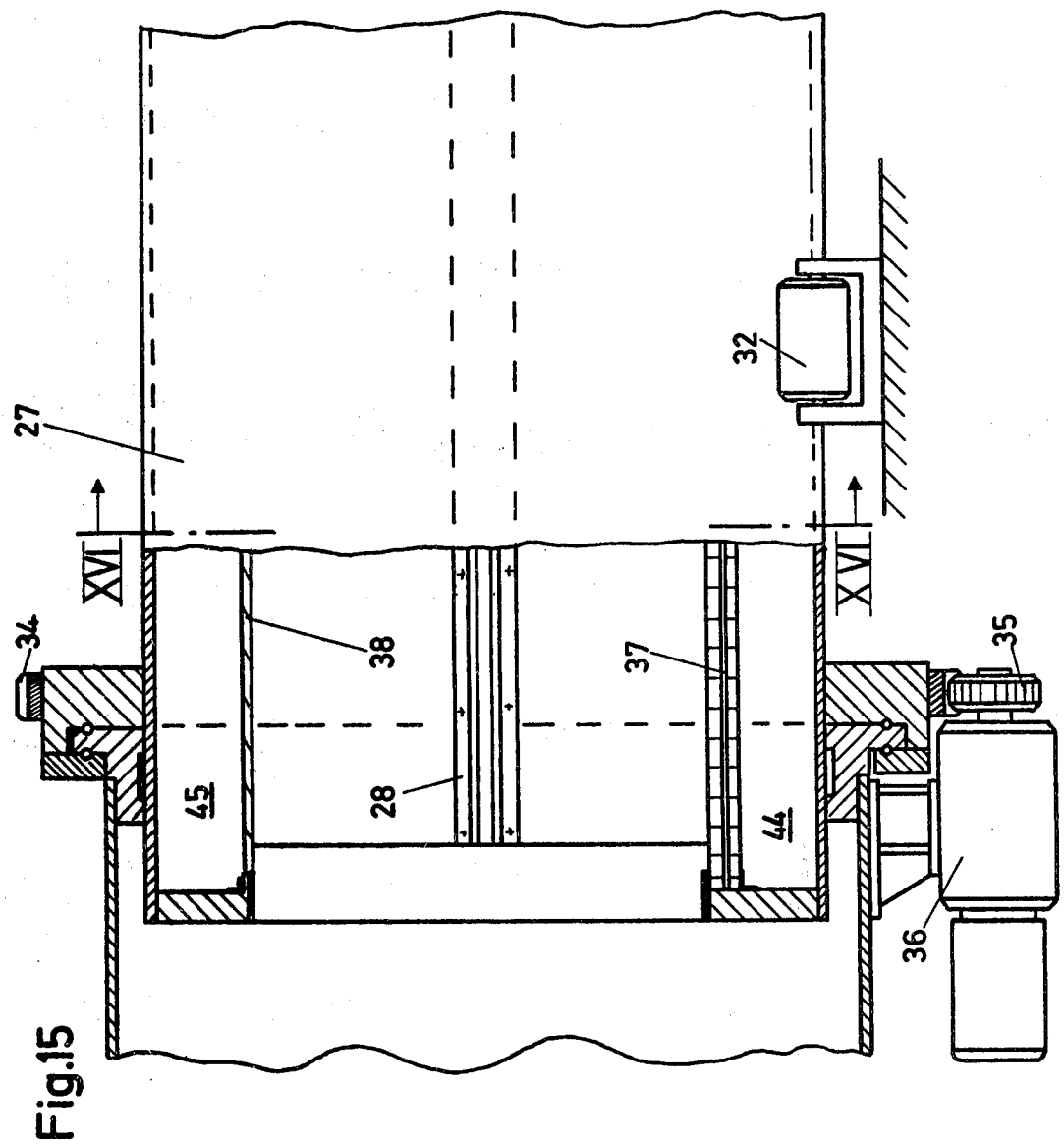

FIG. 15 the tilting device of the second embodiment shown in FIG. 13 but on a larger scale.

Figure 16:
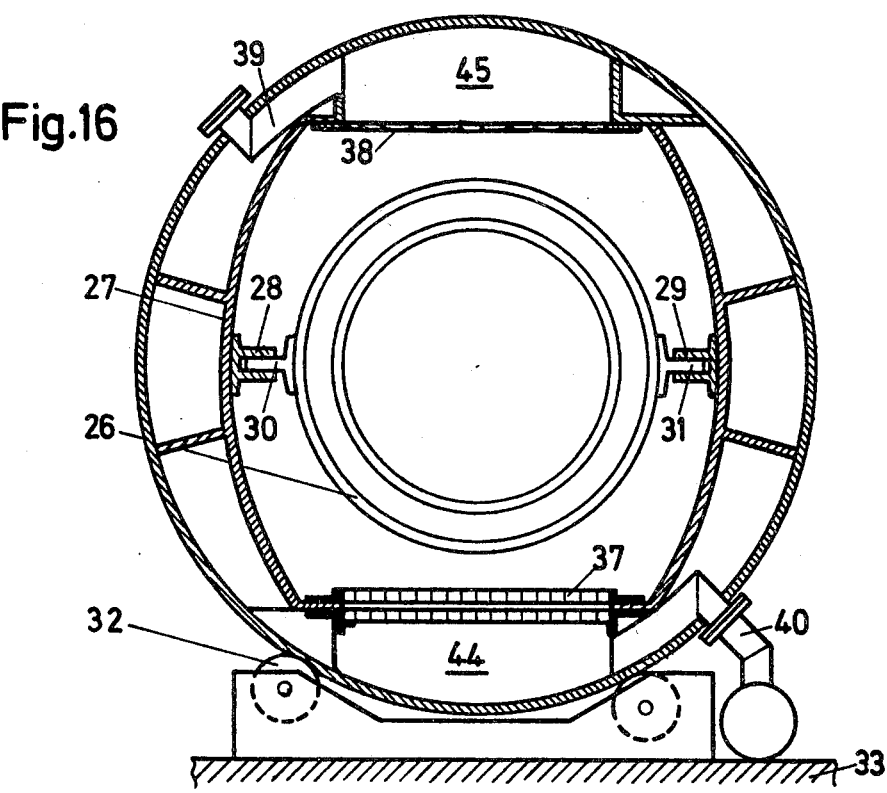

FIG. 16 a cross section along the line XVI—XVI in FIG. 15.

Figure 17:
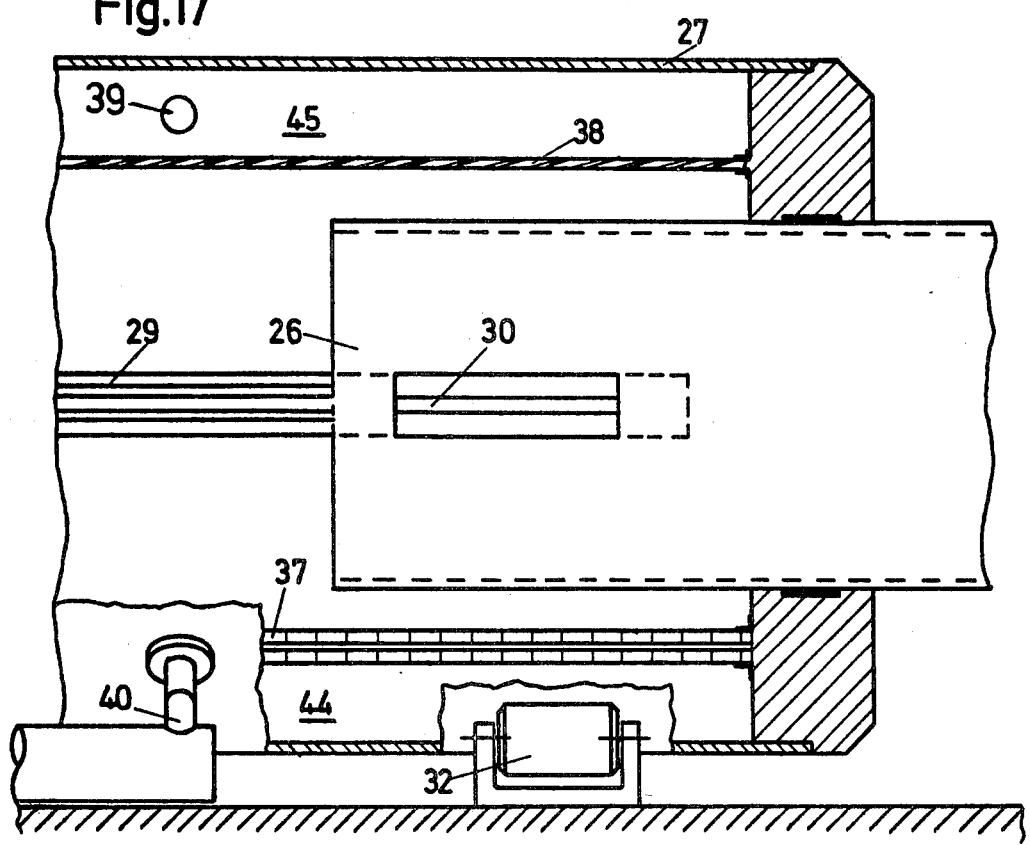

FIG. 17 a longitudinal section along the line XVII—XVII in FIG. 16.

Figure 18:
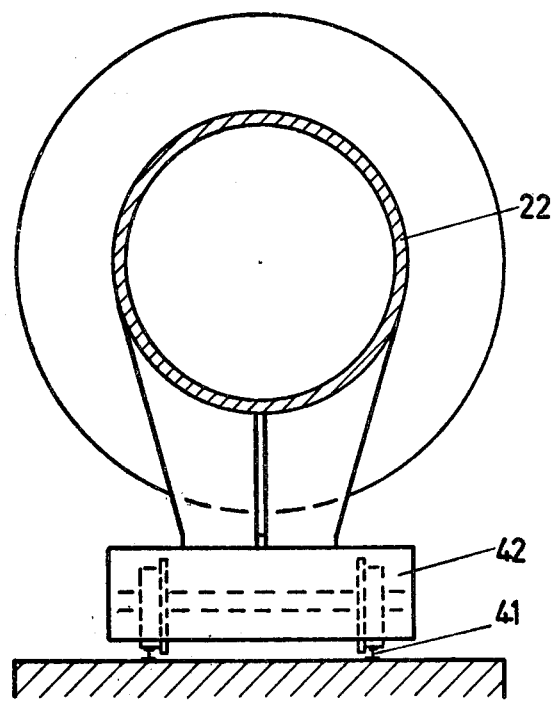
Figure 19:
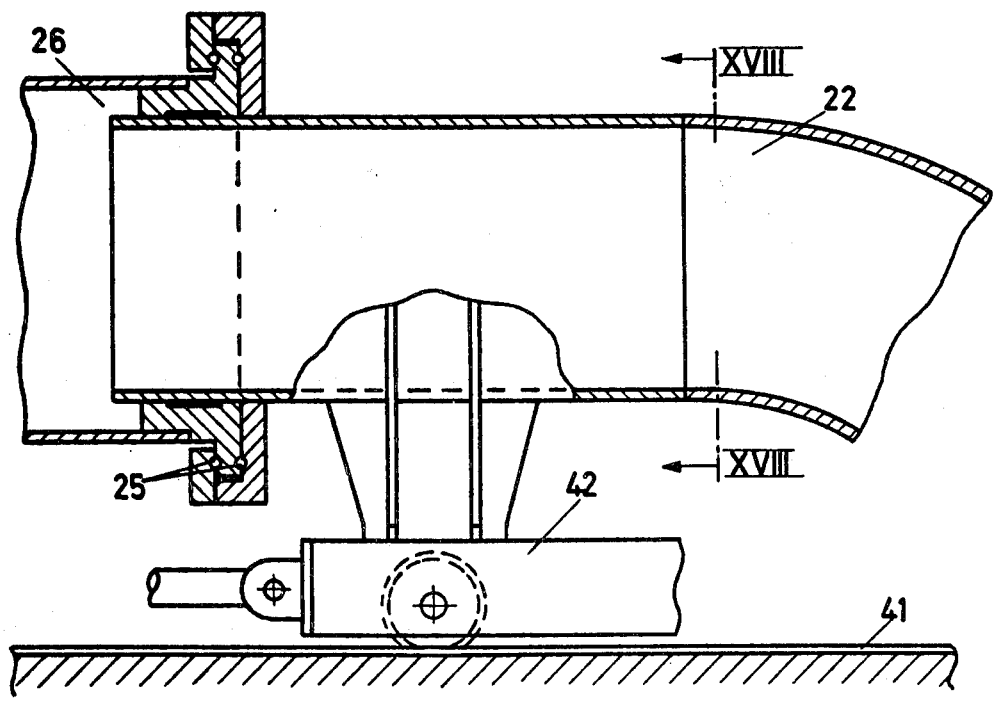

FIG. 18 a cross section along the line XVIII—XVIII in FIG. 19.

FIG. 19 a longitudinal section through a length of pipe of the second embodiment of the invention, in the region of a bend in the pipe.

Figure 20:
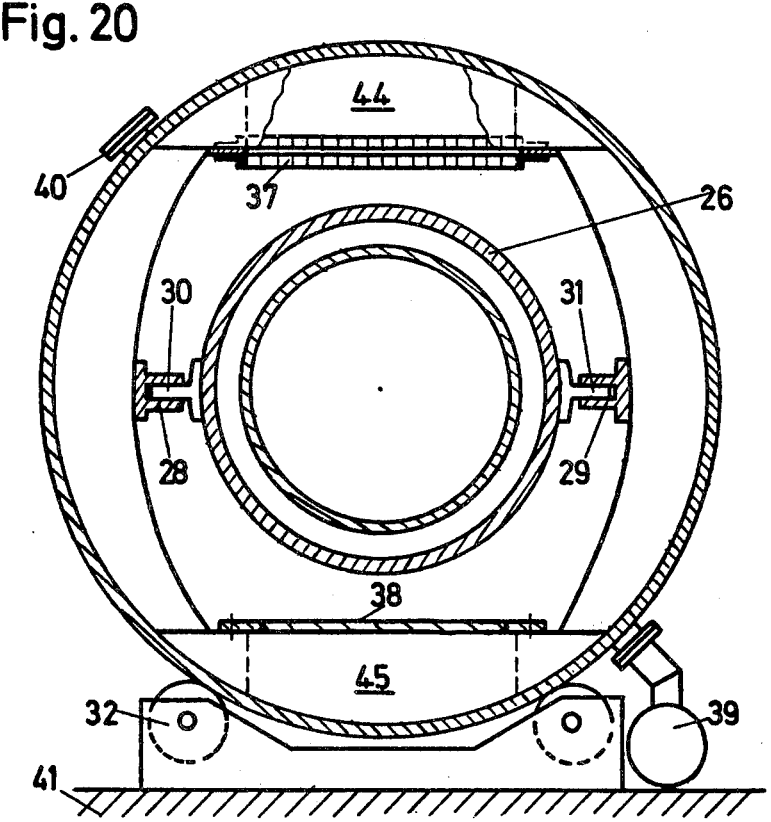

FIG. 20 a cross section through the length of pipe shown in FIG. 15 but with a pipe rotated through 180°.

Figure 21:

FIG. 21 a longitudinal section through a transport base or sheet with sloping slits designed for the transportation of grain.

Figure 22:
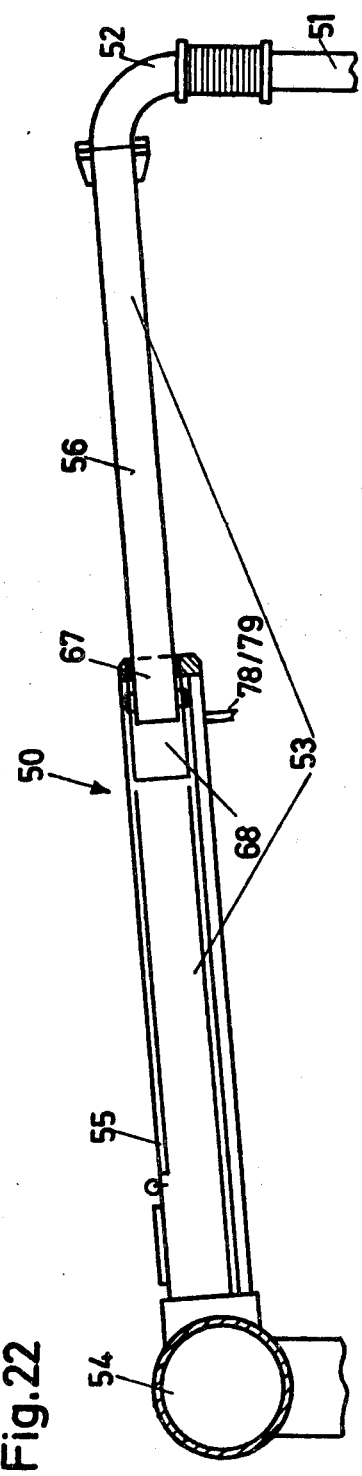

FIG. 22 a third embodiment of a pneumatic unloading device showing a deflection device (68) with which the material being transported can be led into one of two conveyor channels at any one time.

Figure 23:
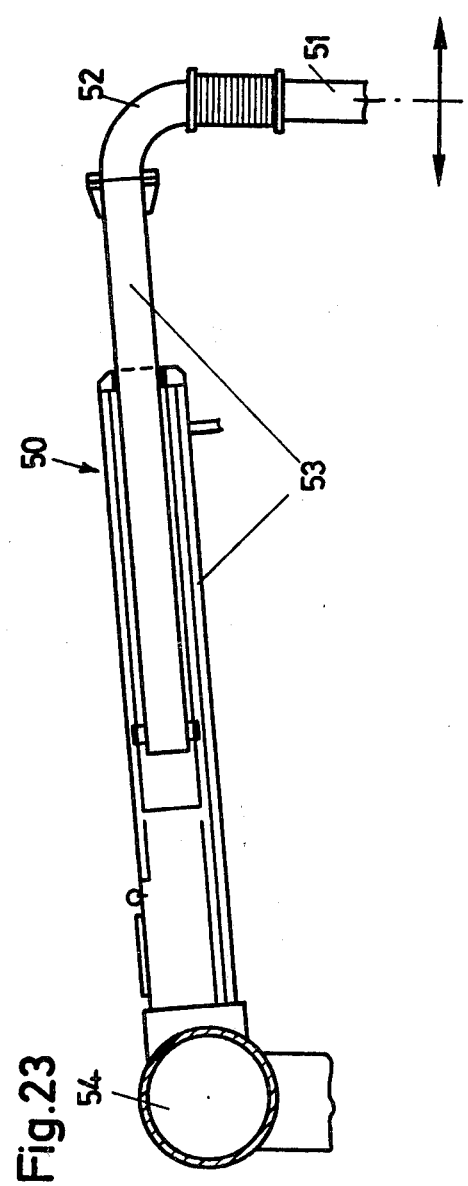

FIG. 23 the third embodiment of a pneumatic unloading device shown in FIG. 22 but with an inner pipe pushed into an intermediate position inside the outer pipe.

Figure 24:
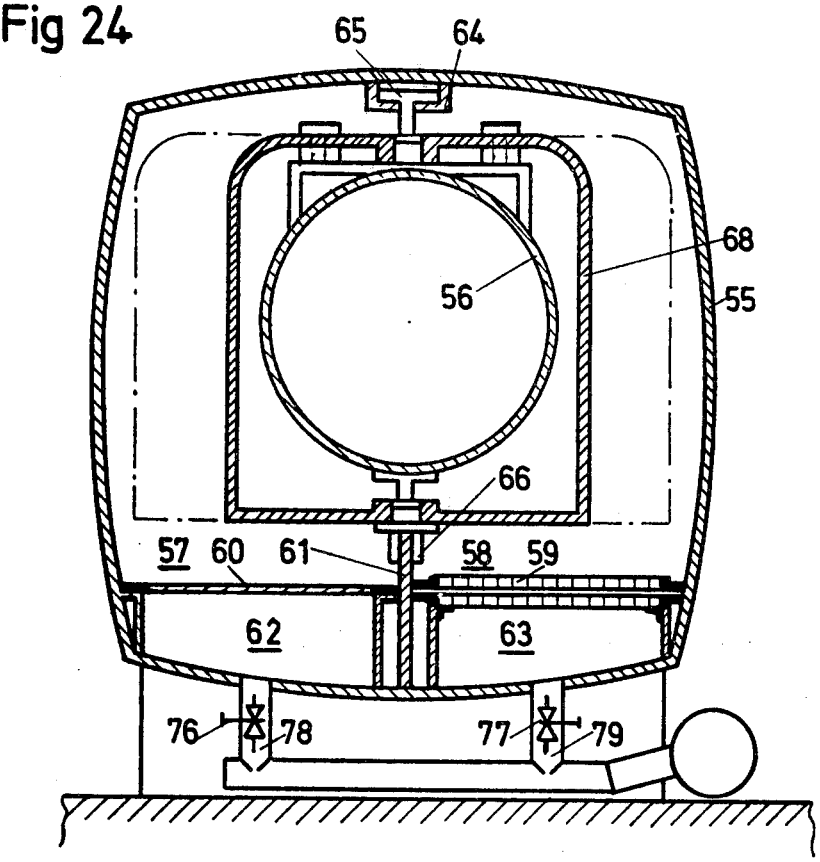

FIG. 24 a cross section along the line XXIV—XXIV in FIG. 22 through the same section of pipe.

Figure 25:
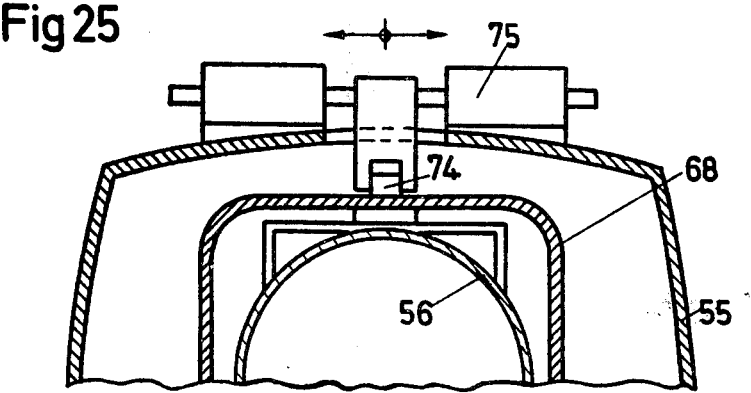

FIG. 25 an end view of the manoeuvering facility for the deflection device shown in FIG. 22.

Figure 26:
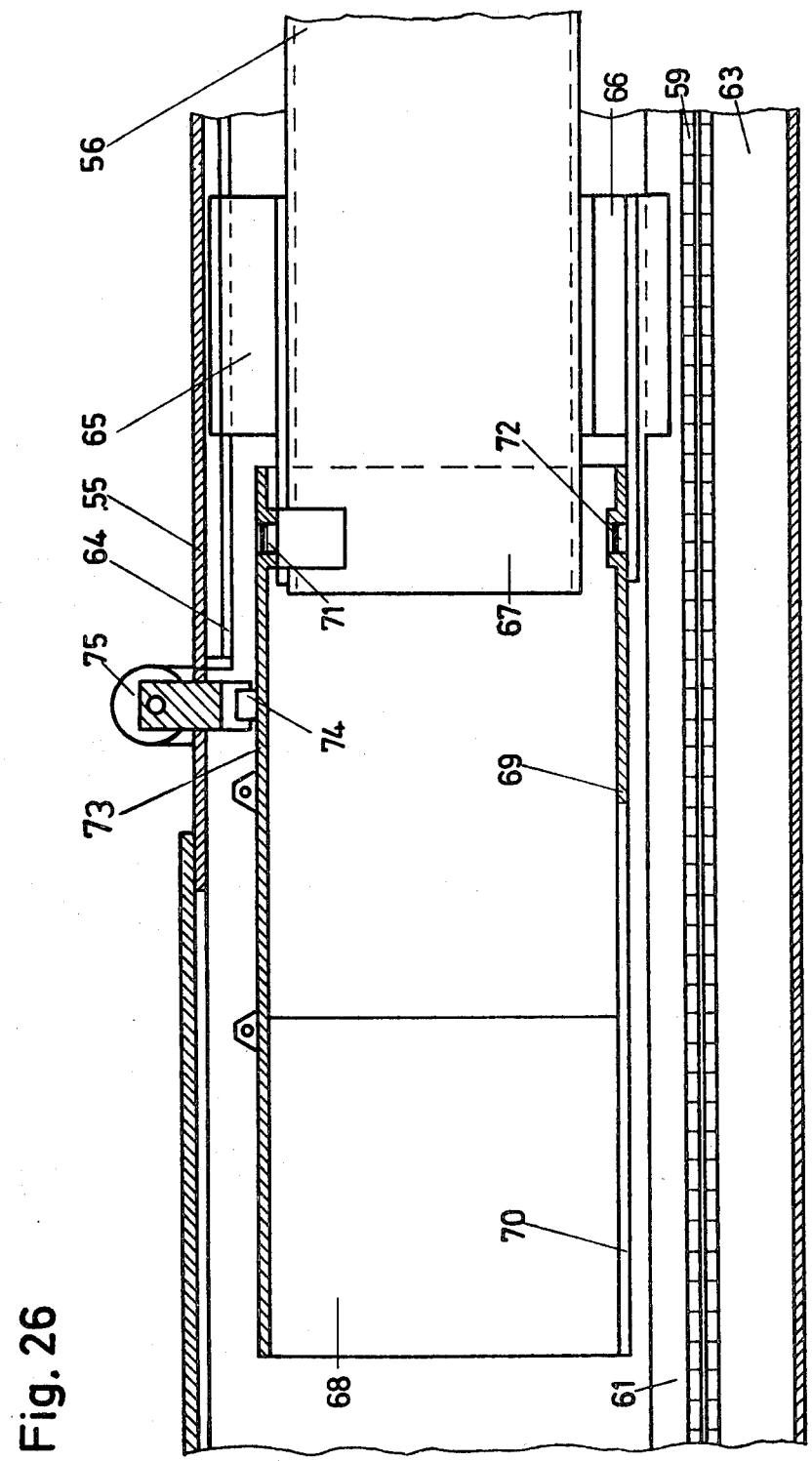

FIG. 26 a side view of the manoeuverable deflection device mounted on the inner pipe and shown in a larger scale than in the FIGS. 22 and 23.

FIG. 27 a plan view of the deflection device shown in FIG. 26 and showing two parallel transportation channels in a section of pipe.

In the first exemplified embodiment illustrated by FIGS. 1-12 the pneumatic unloading device 1 has a telescopic vertical length of pipe 2 which is not shown in detail here for removing material from a ship's hold S, and also a second length of pipe 4 which is principally in a horizontal position and connected to the pipe length 2 via a curved pipe section 3, the length of pipe 4 being preferably connected via a pivot joint 5 to a silo which is not shown here. In the upper part of the silo there is provided a conventional separator and suction pump, by means of which the material being transported is conveyed through both of the previously described pipe lengths 2 and 4 and through the curved pipe section 3 into the silo.

The suction pump is preferably in the form of a rotary compressor with in-line safety filter. The rotatable pivot joint 5 and the length of pipe 4 which is principally in the horizontal position are supported in a manner not illustrated here, in a frame or on a maneuverable rail which can be tilted. The pipe length 4 for transporting the particulate material horizontally is telescopic i.e. can be lengthened and shortened and has a transporting base 7 in the form of a fluidizer base through which air from a fan or blower B, via an air feed pipe 8 and air channel 16 under the base 7 is introduced into the pipe 6 to fluidize the particulate material.

In the outer pipe section 6, which can not be slid back or forwards, U-shaped guide rails 17 are provided parallel to the long axis on the inner wall of the pipe 6 and on which an intermediate pipe 9 is moved forwards and backwards in the axial direction by means of the fixtures 18 mounted on the outer wall of the intermediate pipe 9. There is furthermore an inner pipe 10 inside the central pipe 9 in which it rests on bearings 11 and can be moved forwards and backwards in the direction of the longitudinal axis.

At the end of the intermediate pipe 9 next to the curved pipe section 3 there is a device 12 which can couple on both sides, is part of a rapid coupling facility 13, and is for releasably connecting at one end to a rapid coupling part 14 fitted to the bent pipe section 3 of the inner pipe 10 and also for releasably connecting to a rapid coupling part 15 fitted to the outer pipe section 6, whereby the channel shaped fluidizer base 7 in the outer pipe section 6 is completely covered by the intermediate pipe 9 (see FIGS. 7 and 8).

In the second exemplified embodiment, illustrated by the FIGS. 13-21, the pneumatic unloading device has similar to the first example a vertical, telescopic first pipe length 21 which is not shown in detail here, and a second length of pipe 23 which is principally in the horizontal position and connected to the pipe length 21 via a curved section of pipe 22, the second length of pipe 23 being connected to a silo, which is not shown in detail here, via a pivot joint 24. Sealing means 25 is provided at the point between pipes 22 and 23.

In contrast to the first embodiment of the invention, there is connected to the curved pipe 22 an inner pipe 26, which can be turned around 180° by means of a device 34,35,36 and which can be pushed telescopically inside an outer pipe 27 close up to the pivot joint 24. In the pipe 27 and diametrically opposite each other there are U-shaped guide rails 28 and 29 which run in the lengthwise direction in the pipe fixed to the inner wall of the pipe 27 and are for accommodating the guide pieces 30 and 31 mounted on to the outside of the inner pipe 26.

The outer pipe 27, as shown in FIGS. 16 and 17, can be tilted about its own axis on the roller bearings of a support rail 33 which is not shown in great detail here. At the end of the outer pipe 27 facing the pivot joint 24 and fixed to the pipe 27 there is a gear wheel 34 which is engaged by a pinion 35 of an electric motor 36 mounted on the pivot joint 24. Inside the outer pipe 27 there are provided two diametrically opposite transportation bases 37 and 38 which can be brought into operation at will, depending on the kind of material being transported, and which are supplied with compressed air from a fan or blower, not shown in detail here, via air feed channels 44 and 45 below and above the bases 37 and 38 respectively as shown in FIG. 17 and via air feed pipes 39 and 40 which connect up with these channels. The transportation base 37 is a fluidizing base. It comprises a fluidizing mesh with an upper and lower grating for fine grained fluidizable materials such as, for example, alumina, cement and similar materials. On the other hand the transportation base 38 shown in FIG. 21 is used to transport heavy materials or materials which are difficult to fluidize such as particulate materials e.g. grain, coke, unrefined phosphates etc., in which case streams of air are directed through slit shaped channels 43, which are in the transportation base 38 and inclined at an angle towards the material in the pipe 27 and whereby, in combination with the suction in the pipe 27, an extremely economic use of energy is effected for the transportation of the materials of the kind described earlier. As shown in FIG. 14, the inner pipe 26 is supported in the vicinity of the bend 22 by a trolly 42 which runs on rails 41 of the support facility 33 which allows the inner pipe 26 to be moved backwards and forwards (see also FIGS. 18 and 19).

The third exemplified embodiment of a pneumatic unloading device, as illustrated in FIGS. 22-27 has, in the same manner as the first and second embodiments but not illustrated in great detail here, a vertical telescopic pipe section 51 and, connected to this via a curved section 52 a second length of pipe 53, which is principally in the horizontal position and is connected via a rotatable pivot joint 54 to a silo which is not shown in detail here.

In contrast to the first and second embodiments there are, as shown in FIGS. 24 and 27, provided on the floor of the outer pipe 55 of the two pipes 55 and 56 which can be telescoped together, two conveying channels 57 and 58 which have transportation bases 59 and 60 of different construction, which correspond in design to the previously described transportation bases 37 and 38 of the unloading device 20 of the second exemplified embodiment. The base 59 is used for the transportation of easily fluidized, fine grained material such as alumina or cement and the base 60 for the transportation of coarse grained particulate material such as grain, coke, unrefined phosphates and similar materials which are relatively difficult to fluidize. Under each of the channels 57 and 58 which are separated by the wall 61, there are provided air feed channels 62 and 63 which are connected to a blower, which is not shown here, via air feed pipes 78 or 79 which are fitted with stop valves, 76 and 77 respectively, which can stop the flow of air to any channel 57 or 58 of choice so that air can be injected separately through the two bases 59,60.

The inner pipe 56 which is fixed securely to the curved pipe section 52 is slid backwards and forwards in the axial direction in the outer pipe 55 on the guide rails 64 mounted in the outer pipe 55 and on the wall 61 which is also fixed to the outer pipe 55 and this with the help of the guide pieces 65 and 66. On the extension 67 of the inner pipe 56 there is a movable deflection piece 68 with which fine or coarse grained material emerging from the inner pipe 56 can be led to one of the two channels 57 or 58 in the outer pipe 55. In the bottom face 69 of the deflecting piece 68 there is provided, as shown in FIG. 27, an opening 70 which preferably forms an acute angle and allows the material being transported to be guided into or allowed to drop into the chosen channel 57 or 58.

As shown in FIGS. 25 and 26 the deflecting piece 68 at the exit end 67 of the inner pipe 56 is on vertically oriented bearing studs 71 and 72 so that the deflecting piece can pivot there. At a specific distance from the bearing stud 71 there is provided in the upper side of the roofing 73 of the deflecting piece 68 a securely fixed stud 74 on which an arm of a known sliding mechanism 75, mounted on the outer pipe 55, engages making movement of the deflecting device possible in a direction transverse to the length of the pipes 55,56.

The mode of operation of the pneumatic unloading device is, as in the three previously described embodiments, as follows:

In the case of the first exemplified embodiment the fluidizing base 7 in the outer pipe section 6 is put into operation by supplying air to it via the pipe line 8 and feed channel 16 to fluidize fine grained materials such as alumina or cement, and the intermediate pipe section 9 moved up to the rapid coupling facility 14 of the inner pipe section 10 close to the curved pipe section 3 and coupled with this. During the unloading, the material from the curved pipe section 3 is fed to the inner pipe 10 and then on to the upper grating of the fluidizer base 7 where it is fluidized by the air stream flowing from below and transported further also with the help of suction (see also FIGS. 1 and 2).

In order to transport particulate material such as grain or unrefined phosphate etc., after first cleaning out the fluidizing channels 7, the intermediate pipe 9 is drawn in the direction of the pivot joint 5 and the rapid coupling facility 12 of the intermediate pipe 9 coupled to the rapid coupling facility 15 of the outer pipe 6, with the result that the intermediate pipe 9 completely covers the fluidizing base 7. Furthermore, the air supply line 8 for the channel 16 under the fluidizing base 7 is put out of operation. The velocity of the material in the suction or delivery stream in the inner pipe 10 falls as the material enters the outer pipe 6 which is of larger diameter; then after passing through pipe 6 the material enters the silo (not shown here) via the pipe shaped pivot joint 5.

In the case of the second exemplified embodiment the outer pipe 27 of the unloading device 20 is turned by means of an electromotor 36, or if desired manually, for the transportation of fine grained materials such as alumina or cement, so that the fluidizer transportation base 37 is at the bottom and the air feed channel 43 under this base 37 is connected up to the air supply line 39. The fine grained material arrives then directly on to the upper grating of the transportation base 37 and is transported further pneumatically by the air stream from below over the base 37, through the pipe shaped pivot joint 24 to a silo which is not shown here.

In order to transport coarse grained material, the outer pipe 27 of the unloading device 20, after first cleaning the base 37, is rotated together with the inner pipe 26 i.e. the whole horizontal conduit 23 is rotated around 180°.

The transportation base 38 with slit shaped channels 43 for the transportation of coarse, particulate materials then lies at the bottom and is put into operation by connecting the air feed channel 44 under the base 38 to the air supply line 40, with the result that the air stream emerging from the slit shaped channels 43 in the base 38 engage the granular material and, together with the suction forces, conveys the material along the conduit.

In the case of the third embodiment the inner pipe 56, which is connected securely to the curved pipe 52, slides in the interior of the outer pipe 55 over the two pneumatic transportation facilities or bases 59 and 60.

In order to operate the deflecting device 68 at the exit end of the inner pipe 56, the sliding mechanism 75 which engages this device 68 is operated in such a way that the material transported by the pneumatic force and emerging from the inner pipe 56 can be led at will on to one of the two pneumatic transportation facilities or bases 59 or 60.

The invention is not limited to only these three embodiments illustrated in FIGS. 1-27. It is also possible, within the scope of the invention, for example to provide the unloading device only with the principally horizontally positioned conduit if there were no great difference in height to overcome between the unloading and loading stations. In this connection it should be noted in particular that especially on unloading fine grained material the speed of the air stream is set such that the material moves over the fluidizing base in the form of a layer with the result that the lighter component of the material, or dust, is above the layer of fine grained material and can be separated from the material with the help of a dust separator. See e.g. the Swiss Pat. No. 531.970.

In comparison with the unloading device of the above Swiss patent the range of application of the unloading device of the present invention is considerably extended in an advantageous manner, since a plurality of different kinds of coarse or fine grained material can now be unloaded with one single unloading device, without a plurality of unloading devices of the known kind being required, as has been necessary up to now.

What is claimed is:

1. A pneumatic conveying device for transporting material such as alumina, grain or the like from a ship's hold comprising:
   at least one pipe means having a material inlet and a material outlet, said pipe means being substantially horizontally disposed;
   at least one elongated fluidizing base means provided within said at least one pipe means extending substantially from said inlet to said outlet;
   motive means for introducing air under pressure into said at least one fluidizing base means so as to move said material from said inlet of said pipe means to said outlet thereof;
   adjustment means associated with said pipe means for varying the effective length of said at least one fluidizing base so as to optimize the conveying efficiency of said device for the particular material transported;
   said adjustment means comprises a second pipe means telescopically received within said at least one pipe means and movable between a first position wherein said at least one fluidizing base means is completely covered to a second position wherein said at least one fluidizing base means is completely uncovered;

said second pipe means comprises an intermediate pipe and an inner pipe, said inner pipe being provided with a curved section at the end thereof extending beyond the inlet of said at least one pipe means, said curved section being adapted with means for connecting said inner pipe to a vertical pipe;

wherein said intermediate pipe at its end adjacent said curved section of said inner pipe is provided with coupling means, said coupling means including means for connecting a coupling facility provided on said curved section of said inner pipe with a coupling facility provided on said at least one pipe section.

2. A pneumatic conveying device according to claim 1 wherein motive means comprises blower means and valve means positioned between said blower means and said at least one fluidizing base means for selectively interrupting said air introduction.

3. A pneumatic conveying device for transporting material such as alumina, grain or the like from a ship's hold comprising:

at least one pipe means having a material inlet and a material outlet, said pipe means being substantially horizontally disposed;

at least one elongated fluidizing base means provided within said at least one pipe means extending substantially from said inlet to said outlet;

motive means for introducing air under pressure into said at least one fluidizing base means so as to move said material from said inlet of said pipe means to said outlet thereof;

adjustment means associated with said pipe means for varying the effective length of said at least one fluidizing base so as to optimize the conveying efficiency of said device for the particular material transported;

said at least one pipe means is provided with a plurality of elongated fluidizing base means of different transporting characteristics wherein one of said fluidizing base means is functional while the others are not.

4. A pneumatic conveying device according to claim 3 wherein said at least one pipe means is provided with drive means for rotating said pipe means so as to selectively position any one of said plurality of said fluidizing base means with respect to said motive means for introducing air under pressure therein.

5. A pneumatic conveying device according to claim 4 wherein said drive means comprises an electric motor means and gear means secured to said at least one pipe means, said electric motor means being adapted to drive said gear means.

6. A pneumatic conveying device according to claim 3 further including guide means within said at least one pipe means, said guide means being provided with an opening, drive means for selective positioning said guide means with respect to any one of said plurality of said fluidizing base means so as to deliver said material to be transported to said selected fluidizing base means.

7. A pneumatic conveying device according to claim 6 wherein said drive means includes means for slidably positioning said guide means.

8. A pneumatic conveying device for transporting material such as alumina, grain or the like from a ship's hold comprising:

at least one pipe means having a material inlet and a material outlet, said pipe means being substantially horizontally disposed;

at least one elongated fluidizing base means provided within said at least one pipe means extending substantially from said inlet to said outlet;

motive means for introducing air under pressure into said at least one fluidizing base means so as to move said material from said inlet of said pipe means to said outlet thereof;

said at least one pipe means is provided with a plurality of elongated fluidizing base means of different transporting characteristics wherein one of said fluidizing base means is functional while the others are not.

9. A pneumatic conveying device according to claim 8 wherein said at least one pipe means is provided with drive means for rotating said pipe means so as to selectively position any one of said plurality of said fluidizing base means with respect to said motive means for introducing air under pressure therein.

10. A pneumatic conveying device according to claim 9 wherein said drive means comprises an electric motor means and gear means secured to said at least one pipe means, said electric motor means being adapted to drive said gear means.

11. A pneumatic conveying device for transporting material such as alumina, grain or the like from a ship's hold comprising:

at least one pipe means having a material inlet and a material outlet, said pipe means being substantially horizontally disposed;

a plurality of elongated fluidizing base means provided within said at least one pipe means extending substantially from said inlet to said outlet;

motive means for introducing air under pressure into said plurality of fluidizing base means so as to move said material from said inlet of said pipe means to said outlet thereof;

further including guide means within said at least one pipe means, said guide means being provided with an opening, drive means for selective positioning said guide means with respect to any one of said plurality of said fluidizing base means so as to deliver said material to be transported to said selected fluidizing base means.

12. A pneumatic conveying device according to claim 11 wherein said drive means includes means for slidably positioning said guide means.

* * * * *